Figure 1:
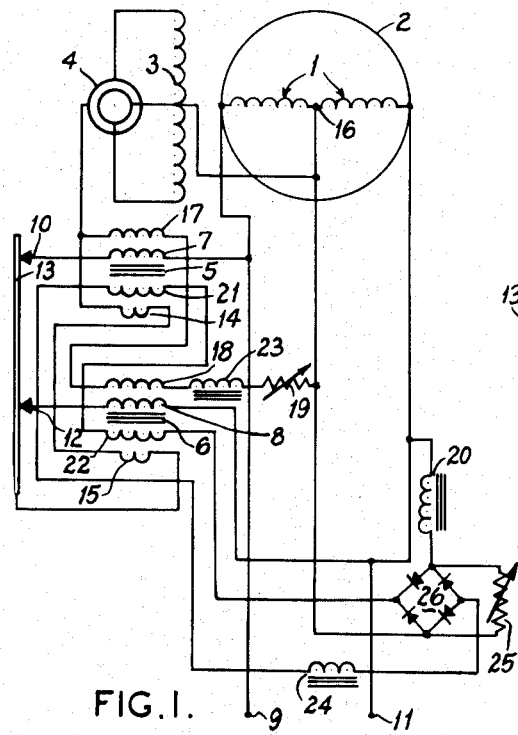

July 7, 1964   E. BRETCH   3,140,437
VOLTAGE REGULATING SYSTEM FOR ALTERNATING CURRENT
GENERATORS UTILIZING HALF WAVE
SELF-SATURATING CORE REACTORS
Filed March 29, 1960

INVENTOR
EDWARD BRETCH
BY Frank Groom Kirtz
ATTORNEY.

United States Patent Office 3,140,437
Patented July 7, 1964

3,140,437
VOLTAGE REGULATING SYSTEM FOR ALTERNATING CURRENT GENERATORS UTILIZING HALF WAVE SELF-SATURATING CORE REACTORS
Edward Bretch, University City, Mo.; A. L. Canavan, executor of said Edward Bretch, deceased, assignor to Helen M. Bretch, Mary Louise Ische and Grace B. Spear
Filed Mar. 29, 1960, Ser. No. 18,385
4 Claims. (Cl. 322—75)

The principal object of my invention is to provide a simple and efficient system utilizing half wave self-saturating saturable core reactors to regulate the amplitude of an alternating current generator's output voltage regardless of the magnitude or power factor of the generator load.

Another object of my invention is to utilize a center tap or neutral tap on the armature winding, together with rectifiers in order to obtain half wave current components, which are then merged to obtain a resultant current which is utilized as the generator field exciting current. An advantage of this approach is that the magnitudes of the half wave rectified components of the generator exciting current flowing through the half wave self saturating saturable core reactors can be easily regulated by small control magnetomotive forces so that the generator output voltage can be maintained constant or caused to either boost or droop under load.

It must be noted that the half wave rectified current components, although pulsating, have been rectified and are therefor unidirectional. Each current component therefor when passing through the saturable reactor, imposes a unidirectional magnetomotive force (hereinafter abbreviated as M.M.F.) upon the reactor core. This M.M.F. tends to saturate the core magnetically in that one direction. Consequently the impedance of the half wave reactor to the flow of the rectified current in the direction of its M.M.F. is decreased as the magnitude of the rectified current increases.

For my invention, I obtain a small, constant and unidirectional resultant M.M.F. on each reactor core. This I accomplish by means of a superposed control winding or windings excited by direct currents. The effect of this is to superpose that constant unidirectional resultant M.M.F. on the core so that the following control process takes effect: the impedance to the flow of the previously mentioned half wave rectified current is varied by the resultant superposed control M.M.F. of the control windings.

This resultant control M.M.F. can either increase or decrease the reactor impedance to the flow of the rectified half wave current. When the half wave current M.M.F. and the control M.M.F. are in the same direction, the total impedance of the reactor is decreased due to the increased magnetic saturation of the reactor core. When the half wave current M.M.F. and the control M.M.F. are in opposition, the impedance of the reactor is increased since the degree of saturation of the reactor core is lessened thereby.

The great advantage derived from my control system is that it utilizes the inherent simplicity of a half wave saturable core reactor. A half wave saturable reactor consists of a closed magnetic core linked by two or more windings, utilizing the non-linear magnetization curve of the ferromagnetic core material to achieve control effects. The magnet core is similar to a transformer core with the main or half wave winding and the direct current control windings linking the same mutual flux similar to the primary and secondary of a transformer. Here however each main half wave winding in series with its half wave self saturating saturable core reactor, its half wave rectifier and one component of the revolving field winding is excited by the voltage derived between one of the generator output terminals and the center tap on the armature. Similar control windings on the reactor cores are connected in series in order to neutralize the feedback in the control windings.

The invention accordingly consists in the features of construction, combinations of elements and arrangement of parts as will be exemplified in the structures to be hereinafter described and the scope of the application of which will be indicated in the following claims.

Figure 2:
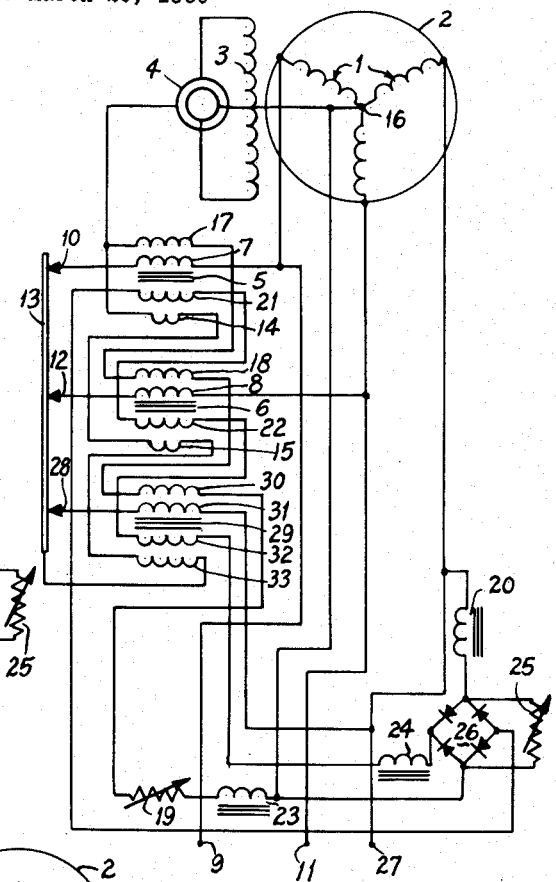
Figure 3:
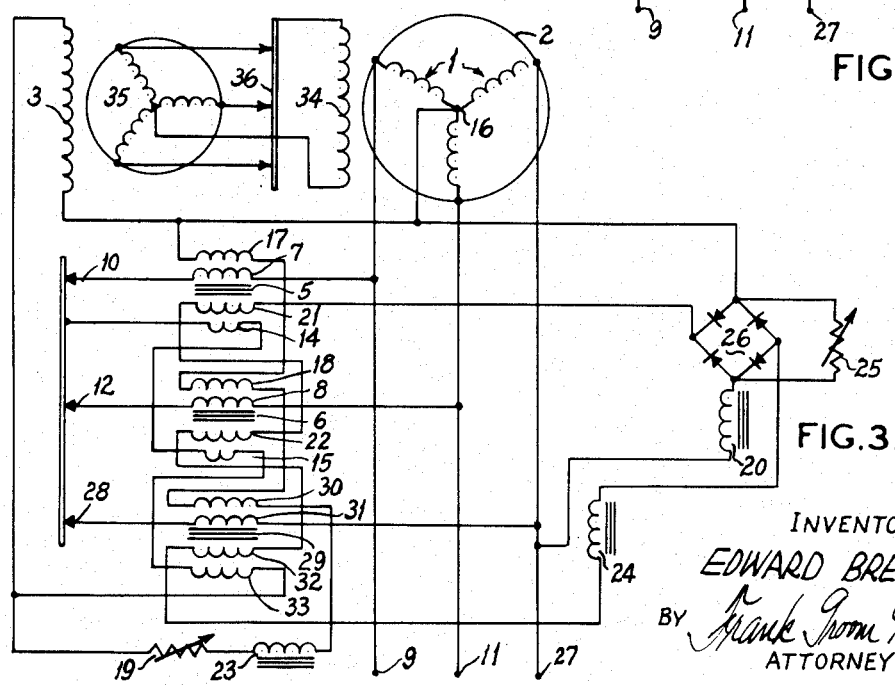

In the accompanying drawing in which I show several of the various possible embodiments of my invention, FIGURE 1 shows diagrammatically a preferred form of regulating system applied to a single phase three wire revolving field generator;

FIGURE 2 shows diagrammatically a form of the invention applied to a three phase generator; and FIGURE 3 shows diagrammatically a form of the invention applied to a brushless three phase generator.

In FIGURE 1, numeral 1 represents the center tapped stator or armature of an alternating current generator 2, provided with a winding 3 for the revolving field, which is excited through the collector rings 4.

There are two magnetic cores, 5 and 6, each associated with a half wave reactor winding 7 and 8. The main or half wave reactor winding 7 on the magnetic core 5 is connected between the output terminal 9 of the generator and the half wave rectifying element 10.

Similarly the main or half wave reactor winding 8 on core 6 is connected between the output terminal 11 and a second half wave rectifying element 12. There are therefor two half wave rectified currents, one through each of the rectifying elements 10 and 12. They are merged at junction 13 and their resultant is a full wave rectified single phase current. This current is conducted from junction 13 through the reactor control windings 14 and 15 in series to one of the collector rings shown at 4. The current then passes through the revolving field winding 3 and back to the other of the collector rings shown at 4, and from there to the central or neutral armature tap 16.

I provide trimmer windings 17 and 18, which in general have many turns, to adjust the effect of control windings 14 and 15. The windings 14 and 15, carrying the generator field exciting current, require few turns, and in fact may only require one turn. Frequently a single turn overcompounds, that is, it generates an excessive boost of the generator voltage under load. Since it is impossible to add more than one turn and yet add less than two turns, I employ trimmer windings 17 and 18. The trimmer windings are superposed on the windings 14 and 15 in such a sense as to develop trimming counter M.M.F.'s, trimming the M.M.F., for instance, in the following manner.

The control M.M.F.'s applied to the reactor cores 5 and 6 by the revolving field current flowing through the control windings 14 and 15, minus the trimming counter M.M.F.'s of the trimmer windings 17 and 18 act in unison with the unidirectional pulsating M.M.F. developed by the half wave currents in the reactor windings 7 and 8. The algebraic sum of these M.M.F.'s acts to decrease the impedance of the half wave reactors to the flow of the half wave rectified components of the generator field exciting current when and as the load increases across the output terminals 9 and 11. The effect therefore is to increase the exciting current as the load increases.

I include a rheostat 19 which can be set at a position which will cause the generator voltage to boost under load to compensate for line drop or engine speed drop, or it can be set at another position to cause a droop under load for parallel operation of the generator.

This construction is chosen because of the requirement for abrupt load changes. While the M.M.F.'s developed entirely from a generator field voltage could be adjusted by a rheostat and would serve a similar purpose as the M.M.F.'s generated in 14 and 15 minus those in 17 and 18, for a steady load, the response would be sluggish for such abrupt, heavy load changes as those involved in starting comparatively large squirrel cage motors.

In order to adjust the normal no load or rated voltage, I supply a voltage sensing reactor 20 which provides a counter M.M.F. responding to the generator output voltage, by means of the control windings 21 and 22. This counter M.M.F. is adjusted by means of rheostat 25 to neutralize the excess of the M.M.F. from 7 and 8 plus that of 14 and 15 minus that of 17 and 18 at a definite no load generator output voltage which is the rated voltage of the generator.

I adjust the no load output voltage or the open circuit load voltage by means of the rheostat 25 which I provide on the voltage sensing reactor circuit, between the reactor 20 and the center tap 16. I adjust the compounding by means of the rheostat 19.

An additional point is the following: although rectified currents are unidirectional, they contain ripples which may interfere with their satisfactory use as control currents if the ripples are not suppressed. It is therefore advisable to include the chokes 23 and 24 as ripple suppressors for the rectified currents.

The full wave self saturating voltage sensitive reactor 20 is connected across some element of the armature winding 1, maintaining a voltage proportional to the generator output voltage. An adjustable portion of the reactor current through the voltage sensitive reactor 20, adjusted by the rheostat 25 is rectified by the full wave rectifier 26 and thence conducted through the control windings 21 and 22. There in 21 and 22 counter M.M.F.s are developed in opposition to the resultant of the M.M.F.s in 7 and 8, plus those in 14 and 15, minus those in 17 and 18. The reactor 20 is chosen such that the current flowing through the reactor increases abruptly with respect to the increase in applied voltage at the rated voltage. Thus the operating voltage is affected quickly.

A steep increase in the counter M.M.F.s in 21 and 22 near the rated voltage or operating voltage results from the abrupt increase in the output of 20. By means of adjusting the setting of rheostat 25, the excess M.M.F. tending to increase the generator output voltage can be neutralized for the no-load output voltage of the generator.

By careful design the various control M.M.F.s can be superposed and adjusted to obtain the following result: the resultant M.M.F. acting on the reactor cores maintains a constant voltage level at the generator output terminals 9 and 11 from no load to as much as 100% overload. Furthermore, since the revolving field exciting current for a given kilowatt load increases as the power factor decreases, the effect of the generator field exciting current in generating M.M.F. in the control windings 14 and 15 minus 17 and 18, automatically compensates for the effect of the decreased power factor of the load on the generator output voltage.

In FIGURE 2, I show the application of my system to a three phase generator. The principal difference is that in this case there are three generator output terminals, 9, 11 and 27 requiring three half wave rectifiers, and three reactor cores 5, 6 and 29 to supply the generator field exciting current. The resultant of the three merged half wave current components is a three phase half wave rectified current instead of a single phase full wave current. However, it serves the same purpose as the generator exciting current. Each core has four windings associated with it as before. The first two are numbered exactly as before, and the windings on core 29 are numbered 30, 31, 32 and 33. It will be noted that rheostat 19 is in series with the winding 30 and then 18 and as before 17. Similarly the chokes 23 and 24 are placed in the circuit as ripple suppressors.

In FIGURE 3 I show the application of my system to a brushless three phase generator. The rotor includes, on the same revolving shaft, the revolving generator field winding 34, the alternating exciter armature 35 excited by the stationary field winding, and a rectifier 36 revolving with the rotor, delivering rectified direct current from the armature 35 direct to the revolving generator field winding 34. In the case of FIGURE 3, the voltage regulating system is used to regulate the field exciting current of the exciter armature 35 in response to the generator output voltage. The other windings and parts I have given the same numbers as in FIGURE 2 since their operation is analogous.

The generator excitation is normally drawn directly from the generator output terminals. However, in the case of a high voltage generator this is not practical and it is usual practice to reduce the voltage applied to the generator exciting circuit by means of a step down transformer. In this case the half wave branch circuits of the voltage regulator are excited from the terminals of the step down transformer instead of the generator output terminals.

Having thus described my voltage regulating system, what I desire to secure by Letters Patent is:

1. A voltage regulating system for an alternating current generator with a direct current excited field winding, and an armature developing a plurality of substantially equal alternating voltages phased symmetrically with respect to time, a plurality of phase windings on said armature all having a neutral connection and each having one load connection, a half wave self-saturating saturable reactor consisting of a core and a plurality of associated windings controlling each phase, a half wave rectifier connected in series with one winding on each of said saturable core reactors, means connecting one side of each of said one reactor windings respectively to each of said generator load connections whereby said windings respond to the generator output voltages, means connecting one side of each of said rectifiers to a common junction, a second winding on each of said reactors that is responsive to and controlled by the magnitude of the generator field excitation current, said second reactor windings being connected in a series circuit between the said common rectifier junction and one side of the generator field winding, the opposite side of said field winding being connected to the neutral connection of the phase windings, a trimmer winding on each saturable core excited by the generator field voltage, impedance varying means in series with said trimmer windings to control the current therethrough, a voltage sensitive element connected to respond to the output voltage of the generator, a full wave rectifier having input connections connected to said voltage sensitive element for rectifying at least a part of the output of said voltage sensitive element, and a fourth winding on each saturable core and a choke connected in series across the output connections of said full wave rectifier.

2. A voltage regulating system for an alternating current generator having a field winding excited by direct current and an armature developing a plurality of equal alternating voltages from a plurality of phase windings on said armature, each of said phase windings having a load connection and a connection to a neutral terminal, a saturable core reactor and a half wave rectifier associated with each load connection, each of said reactors having a main control winding connected at one end to a corresponding load connection, the opposite end of each of said main control windings being connected respectively to one side of one of said half wave rectifiers, the opposite sides of said half wave rectifiers being connected to a common connection, a second winding on each of said reactors, means connecting said second reactor windings in a series circuit between said common connection and one end of the generator field winding, means connecting the opposite end of the field winding to the neutral terminal of the phase windings, and a third winding on each of said saturable core reactors connected to respond to an output voltage of the generator, at least one winding on each of said reactors being wound so that its magnetomotive force opposes the magnetomotive force produced by another of said reactor windings.

3. The voltage regulating system defined in claim 2 wherein each of said reactors includes a trimmer winding to adjust the effect produced by the said second reactor windings, said trimmer windings being connected in a series circuit which includes ripple suppressor means and adjustable impedance means, and means connecting said series circuit across the generator field winding.

4. The voltage regulating system defined in claim 2 including means for adjusting the effect produced by said opposing reactor windings, said means including a full wave rectifier having two sets of opposed corners, one of said sets being connected across one of the generator phase windings, the other of said sets being connected across a series circuit including one winding on each of said reactors, ripple suppression means, and adjustable impedance means.

References Cited in the file of this patent

UNITED STATES PATENTS

| | | |
|---|---|---|
| 2,629,853 | Harder et al. | Feb. 24, 1953 |
| 2,666,885 | Bradley et al. | Jan. 19, 1954 |
| 2,728,044 | Stearley | Dec. 20, 1955 |
| 2,768,344 | McKenna | Oct. 23, 1956 |
| 2,769,133 | Franklin | Oct. 30, 1956 |
| 2,839,715 | Shaw | June 17, 1958 |
| 2,891,213 | Kern | June 16, 1959 |